United States Patent [19]

Schonnenbeck

[11] Patent Number: 4,909,778
[45] Date of Patent: Mar. 20, 1990

[54] LINK CHAIN FOR AN INFINITELY VARIABLE CONE DISK OR CONE PULLEY TRANSMISSION

[75] Inventor: Gert Schonnenbeck, Bad Homburg, Fed. Rep. of Germany

[73] Assignee: Reimers Getriebe AG, Zug, Switzerland

[21] Appl. No.: 336,321

[22] Filed: Apr. 11, 1989

[30] Foreign Application Priority Data

Jun. 9, 1988 [DE] Fed. Rep. of Germany ....... 3819599

[51] Int. Cl.⁴ ............................................. F16G 13/08
[52] U.S. Cl. .................................................. 474/245
[58] Field of Search ........ 474/245, 242, 237, 215–217, 474/201

[56] References Cited

U.S. PATENT DOCUMENTS

| | | | |
|---|---|---|---|
| 4,344,761 | 8/1982 | Steuer | 474/245 |
| 4,449,960 | 5/1984 | Van Der Lely | 474/215 X |
| 4,581,001 | 4/1986 | Rattunde et al. | 474/214 |
| 4,618,338 | 10/1986 | Rattunde et al. | 474/245 |
| 4,795,406 | 1/1989 | Dittrich et al. | 474/242 X |

FOREIGN PATENT DOCUMENTS 3027824 2/1982 Fed. Rep. of Germany .
87158159 3/1988 Fed. Rep. of Germany .

*Primary Examiner*—Thuy M. Bui
*Attorney, Agent, or Firm*—Frishauf, Holtz, Goodman & Woodward

[57] ABSTRACT

The link chain is formed of elongated links (2) connected transversely by connecting joints (4) which are formed by pairs of connecting joint elements (1). The connecting joint elements, in cross section, are somewhat crescent-shaped or bent, oval, and define joint engagement surfaces in the region of the terminal ends, for engagement with link engagement surfaces formed in apertures (5) of the link elements (2). The convex side of an inner link element (1) of the pair fits against the concave side of an outer link element of the pair, which, in turn, bears with its joint engagement against the link engagement surface of the aperture. The arrangement permits constructing all the link elements in identical manner, and, further, by placing the joint element pairs in respective link elements with the outermost ones of the link elements engaging, selectively, the link engagement surfaces either with the respective joint engagement surface on the concave side or on the convex side, permits placement of the roll-off of the link elements with respect to each other at different locations with respect to a median or center line, thereby substantially reducing noise level of the chain in operation by preventing sequential repetitive impact engagement of the link elements with a cone disk or cone pulley of the transmission.

10 Claims, 1 Drawing Sheet

LINK CHAIN FOR AN INFINITELY VARIABLE CONE DISK OR CONE PULLEY TRANSMISSION

Reference to related patents assigned to the assignee of the present application, the disclosure of which is hereby incorporated by reference:

German Utility Model Publication GM 8715815.9, Schöpf.

The present invention relates to infinitely variable transmissions, and more particularly to a link chain to connect cone disks or cone pulleys of infinitely variable transmissions, in which the spacing between facing cone surfaces of the cone disks or pulleys can be changed so that the transmission rate between pairs of cone pulleys can be varied, by running the link chain at selected radial distances from the shafts of the cone pulleys in dependence on the spacing of facing cone surfaces of the cone pulleys.

BACKGROUND

The referenced U.S. Pat. No. 4,581,001, Rattunde and Schopf, the disclosure of which is hereby incorporated by reference, describes a link chain, also referred to as a side bar chain, in which apertured link elements are used, connected by pairs of transversely extending connected joint elements. The connecting joint elements pass through apertures in the plate-like link elements, and extend transversely beyond the plate-like link elements for engagement with the side surfaces of the cone disks or cone pulleys. The pairs of connecting joint elements can roll off against each other. The connecting joint elements are in engagement with link engagement surfaces formed by the apertures in the links, the apertures being so shaped that the link engagement surfaces form two defined, spaced contact or engagement regions. The arrangement permits transfer of force from the connecting joint elements to the link elements in such a manner that the link elements are subjected only to tension forces. This tension force is transferred to all the link elements, regardless of whether they are oriented in the direction of run of the chain, or become oriented to loop about a shaft axis of the cone disks or pulleys, that is, are looping in the connecting portion between a forward and a return run of the chain.

The joint elements described and claimed in the referenced U.S. Pat. No. 4,581,001 have both concave and convex contact surfaces, in which, however, the joint elements are of different cross-sectional shape. The arrangement of jointelements with different cross-sectional shape, in practice, has been found to introduce difficulties in assembly of the chain, in storing or stocking spare parts and, especially, in automating manufacture of the chains.

THE INVENTION

It is an object to provide a link chain for an infinitely variable cone disk or cone pulley transmission which can be easily assembled, requires only a minimum number of different elements, and in which is equal to or better than to link chains of the prior art regarding operating characteristics of the chain in an infinitely variable transmission, for example power transfer capability, low operating noise and the like.

Briefly, the joint elements forming the joint element pairs are similar, and preferably exactly identical for all chains of a given design size, that is, the joint elements have the same cross-sectional profile. They can be assembled, however, differently in the links or link elements to provide different pivot spacings of adjacent joints and thus reduce operating noise. In general, the identical joint elements are essentially crescent-shaped and formed with joint engagement surfaces in the vicinity of the terminal regions of the concave and convex surfaces, respectively, definining the essentially crescent shape. The apertures in the links are so shaped that they form clearance recesses to accept, with clearance, the crest of the convex surfaces of the connecting joint elements, that is, the outermost bulge of the convex surface. This clearance recess, typically, will be located along, at least approximately, a median line extending through the apertures of the link elements, when looked at in the direction of the run of the chain. These clearance recesses thus can accept the crest of of the convex surfaces of the connecting joint elements fitted into the apertures and engaging the link engagement surfaces of the link elements, which, then, will be located at either side of this median line.

The cross-sectional shape of the connecting joint elements, in accordance with the present invention, is that of a bent or crescent-shaped oval. It may have essentially parallel sides in which a projection is formed, defining the convex region of the link element, and forming a rocking fulcrum of one link element against another. At the concave side, a recess or cavity is defined. The surfaces forming the projection and the cavity, respectively, merge smoothly with the joint engagement surfaces towards the terminal regions of the link elements, that is, form a uniform, smooth curve.

It has been found that this particular cross-sectional shape combines several engineering or technological and economic advantages.

The chain in accordance with the present invention has the advantage that, for any given size chain, all joint elements can be identical. This substantially reduces storing and stocking problems and has the additional advantage that the connecting joint elements can be cut from a single shaped rod having the aforementioned essentially crescent-shaped cross section. This substantially reduces the cost, since only a single shaped rod is required for the respective chains, reducing not only initial costs but further storing and stocking costs of the manufactured connecting joint elements. An additional advantage obtains in that automatic assembly is greatly simplified since gripper elements for assembling robots then can be designed to grip the connecting joint elements, which become simple when the connecting joint elements are all identical.

The chain in accordance with the present invention operates as well, and to some extent better than prior art chains. It has been found that the paired connecting joint elements provide for centering of the pairs by engagement of the projection of one connecting joint element in the cavity of an adjacent one. As the link chain runs about the cone disks, the connecting joint elements of the pair roll off against each other in the region of the engagement of the projection of one joint element with the cavity of another. The rolling-off of directly paired convex-concave joint elements results in lowered frictional energy loss than of paired link elements which have a convex/convex shape. It is believed that the lower energy loss, and the lower operating noise, is obtained by the shorter pivoting or tipping path with the respective joint elements have to cover as they roll off against each other, with respect to a theoretical median line of the link elements. This tipping or pivoting path is less with a convex/concave pairing of joint elements than with a prior art pairing of convex/-convex link elements, under otherwise identical operating conditions, for example under identical pressure, tension and torque transfer relations as well as condition of Hertz pressures.

The surface pressure of the respective joint elements of the pairs against each other in the region of the contact zone of the projection-cavity is less than that of the contact zone of the convex-convex pairs, thus increasing the lifetime of the joint elements and hence of the chain.

The chain has a substantial and significant technical advantage: With similar mass or weight of the respective joint elements, the chain of the present invention has an advantage over that of the prior art since different pivot spacings can be obtained at adjacent links without, however, changing the centrifugal forces of those joint elements which are in engagement with a cone disk or cone pulley. Since the joint elements are all identical, the centrifugal forces will be identical acting on all those of the joint elements which are on the same radius while in frictional engagement with the cone pulley. This has the additional advantage that similar pressure and friction forces act on all the contact surfaces of the connecting joint elements on the cone pulleys, thus providing uniform torque or power transmission.

The particular shape of the cross section has the further technical advantage that the contoured portions provide smooth transition upon bending of the link chain about the radius of the cone disks of the transmission. In other words, one curve, for example the projecting or convex portion, fits gently against another curve, for example the concave or cavity portion of an adjacent joint element. Thus, an inner curve of the crescent-shaped joint element fits smoothly against the outer curve of an adjacent crescent-shaped element. This smooth engagement prevents the formation of fissures, and hence the destructive notch effects, which may lead to premature breakage of a joint element. The smooth engagement of curve against curve increases the strength, and hence the lifetime of the chain over that of a prior art chain of equal dimension. The link elements can be plate-like, but need not be. A U-shaped or channel-shaped holding link can be provided; other arrangements can be used to hold the links together.

The chain has a substantial and significant technical advantage: With similar mass or weight of the respective joint elements, the chain of the present invention has an advantage over that of the prior art since different pivot spacings can be obtained at adjacent links without, however, changing the centrifugal forces of those joint elements which are in engagement with a cone disk or cone pulley. Since the link elements are all identical, the centrifugal forces will be identical acting on all those of the joint elements which are on the same radius while in frictional engagement with the cone pulley. This has the additional advantage that similar pressure and friction forces act on all the contact surfaces of the connecting joint elements on the cone pulleys, thus providing uniform torque or power transmission.

The particular shape of the cross section has the further technical advantage that the contoured portions provide smooth transition upon bending of the link chain about the radius of the cone disks of the transmission. In other words, one curve, for example the projecting or convex portion, fits gently against another curve, for example the concave or cavity portion of an adjacent joint element. Thus, an inner curve of the crescent-shaped joint element fits smoothly against the other curve of an adjacent crescent-shaped elements. This smooth engagement prevents the formation of fissures, and hence the destructive notch effects, which may lead to premature breakage of a joint element. The smooth engagement of curve against curve increases the strength, and hence the lifetime of the chain over that of a prior art chain of equal dimension.

The particular shape of the connecting joint elements forming the pairs of elements, in accordance with the invention, permit various arrangements of pairing of the elements, since they are similar or, preferably, identical. The joint or linkage formed by the joint elements can be so arranged that the projection or convex sides of one of the elements, engages in the concave or cavity side of the other. In a concave-convex pairing, the pivot axis of the joint will not fall in the axis of symmetry of the joint, but, rather, will be laterally offset. This is different from the prior art convex-convex pairing in which the pivot or rotation axis of the joint will always remain in the symmetry axis thereof. Thus, although the link elements may have the same length throughout, the position of the axis of rotation of the joint can be differently selected for different link elements. Thus, and without any additional expense, the noise level of operation of the chain can be set substantially reduced. This noise occurs upon wrapping of the links about the radius of rotation of the respective cone disks or pulleys. If the pairing of the elements is always the same, a repetitive impact noise results in high operating noise level— which is substantially reduced by merely selective placement of the identical joint elements with respect to each other. The convex surface facing the portion of the link closing off the aperture can be directed either facing forwardly—with respect to the running direction of the chain—or facing backwardly.

In accordance with a preferred feature of the invention, the convex and concave engagement surfaces of the joint elements are so shaped that, in radial direction, they occupy only a portion of the lateral surface of the respective connecting joint element. Preferably, the convex and concave part-surfaces cover about one third to two thirds of the lateral surface of the joint elements.

DRAWINGS (showing an illustrative example)

DETAILED DESCRIPTION

Figure 1:
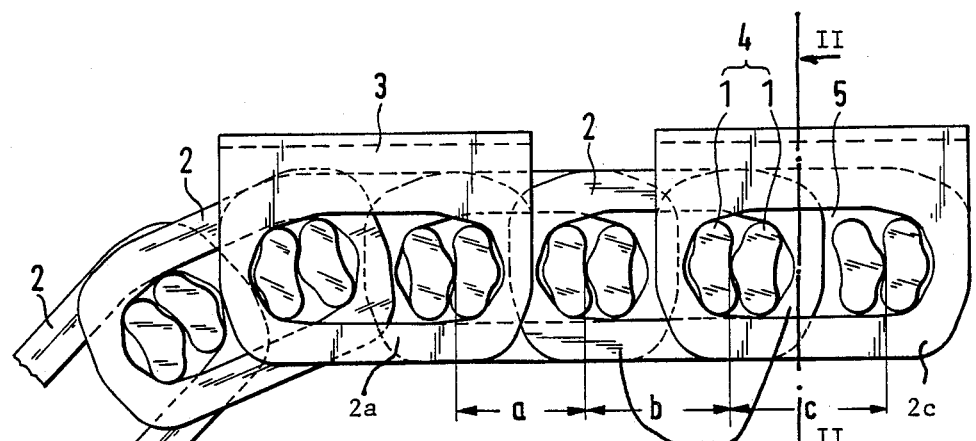
FIG. 1 is a side view of a portion of the chain.
Figure 2:
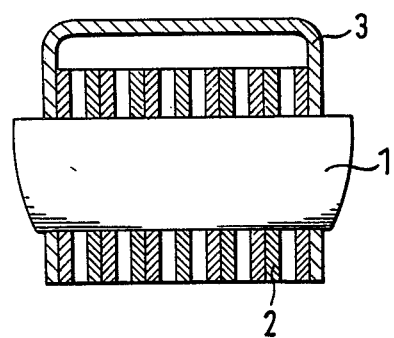
FIG. 2 is a cross-sectional view through the chain in a plane transverse to the longitudinal direction of the chain, in the region of a link, and along line II—II of FIG. 1.

The link chain or side bar chain of FIGS. 1 and 2 has three basic components: An outer, essentially U-shaped or channel-shaped retaining element 3, for retaining links 2 in essential longitudinal, overlapping alignment, and connecting joint elements 1.

The connecting joint elements 1, in accordance with a feature of the invention, are essentially angled crescent-shaped that is, oval with a protrusion or convex side on one side and a cavity or concave side on the other. Two connecting joint elements 1 form a pair, and the pair itself forms a pivot joint 4. The arrangement is so made that the protrusion or convex side of one joint elements fits into the cavity or concave side of an adjacent element. The protrusion at the convex side, as best seen in the drawings, is somewhat pronounced over a smooth convex curve, that is, it forms a projecting nose or bump so that it can fit smoothly into the concave or cavity side of an adjacent joint element and, when the chain is longitudinally stretched, only the protrusion or bump will engage in the concave side of an adjacent joint element, not the entire convex surface, as best seen for example at the right-most link in FIG. 1. The protrusion forms a fulcrum.

In the example selected for the illustrative embodiment, the chain is formed of a sequence of three links which partially overlap. The respective link elements 2 are longitudinally offset with respect to each other to provide for the overlap, see 2a, 2b, 2c. The links 2 are longitudinally connected by the joints 4, and held together transversely by the overlapping link connecting elements 3. The links themselves are formed with apertures 5 in which the joints 4, formed of the joint elements 1, are retained. The apertures 5, internally of the link elements, define link engagement surfaces, against which one of the connecting joint elements 1 is directly engaged, without, however, being free to move with respect to the engagement surfaces. The connecting joint elements each have joint engagement surfaces which engage against the link engagement surfaces. The joint engagement surfaces and the link engagement surfaces are, respectively, so dimensioned and arranged with respect to each other that the joint engagement surfaces do not fit against the link engagement surfaces over their entire radial length but, rather, engage the link engagement surfaces on two regions, remote from each other—with respect to a curve when the chain runs around a cone disk or pulley. The link engagement surface is bulged out centrally so that the bump or protrusion at the convex surface of the engaging connecting joint element 1 does not fit against the central portion of the link engagement surface. In other words, there is a clearance space or free space between the protrusion or bump on the concave surface of the engaging connecting joint element 1 and the inner surface defining the aperture in the link element 2.

The second connecting joint element of the pair has a predetermined pivot range, which determines the smallest radius of curvature about which the chain can be bent, when running around one of the cone disks or pulleys.

The free space or clearance space between the protrusion on the link element 1 and the aperture is clearly seen in FIG. 1; the aperture, thus, is curved at its longitudinal end portions and forms a recess to accomodate the protrusion or bump on the convex surface of the link element, with clearance.

The combination of the link elements in accordance with the present invention in the chain permits three different arrangements. Referring to FIG. 1: A long or extended pitch, shown at "c" is obtained when the inner joint elements of the two joints 4 face each other; in other words, both of the joints 4 are so placed that the protrusions of the outer joint elements 1 face the terminal portions of the adjacent link element, see link 2c. An intermediate pitch "b" is obtained when the concave contact surface of an inner joint element faces the convex contact surface of the other inner joint element. As can be clearly seen from FIG. 1, the outer joint element 1 at the right side fits against the link engagement surface with the concave side facing the terminal part of the link element at the right, whereas, at the left, the arrangement is similar to that of the right-most link, that is, the convex side faces the terminal part of the respective link element 2b.

The smallest pitch, see "a", is obtained when both inner connecting joint elements 1 are so placed that the convex contact surfaces face each other. This is illustrated with respect to link 2a.

The different pitch positions of the pivot points, that is, where the respective pairs of the joint elements roll off againt each other, is possible since, in spite of the same outer shape of all of the link elements as well as all the joint elements, the roll-off line between the concave and the convex surfaces will not be in the geometrical center line of the respective joints 4 formed by the pairs of the joint elements. This arrangement substantially reduces operating noise level, while retaining the advantage of permitting the use of identical link elements 2 and joint elements 1 throughout. FIG. 1 also clearly shows that the link engagement surfaces and, hence, the joint engagement surfaces, are close to the vicinity of the radial or diametrical ends of the respective joint elements.

I claim:

1. Link chain for an infinitely variable cone disk or cone pulley transmission having
    a plurality of link elements (2; 2a, 2b, 2c) formed with apertures (5) therethrough, the boundary lines of which apertures define link engagement surfaces,
    said link elements being assembled in longitudinally staggered position with part of the aperture of a first link element (2c) overlapping part of the aperture of a second and subsequent link elmeent (2b);
    a plurality of connecting joint means (4) comprising pairs of connecting joint elements (1) fitted into the apertures, and connecting adjacent staggered link elements together,
    said connecting joint means transferring pulling force by engagement with the link engagement surfaces,
    said connecting joint elements (1) having end faces projecting beyond the link elements and adapted for frictional engagement with the cone disks or cone pulleys of the transmission;
    wherein, in accordance with the invention,
    the connecting joint elements (1) are generally crescent-shaped and, in cross section, are of similar shape and define, with respect to the longitudinal direction of the chain, a concave surface and a convex surface,
    said surfaces defining terminal ends, and said convex surface defining a crest, and
    joint engagement surfaces located in the vicinity of the terminal ends of the concave and convex surfaces, respectively;
    the convex surface of one link element of the pair is located adjacent the concave surface of the other link element of the pair; and
    wherein said apertures are shaped to provide a clearance recess to accept, with clearance, the crest of the convex surfaces of the connecting joint elements fitted into the apertures and engaging with the link engagement surfaces the joint engagement surfaces of the outermost of the connecting joint elements of the pairs forming said connecting joint means (4).

2. The chain of claim 1, wherein said convex and concave surfaces of the joint elements (1) form pivoting or roll-off surfaces for the pairs of connecting joint elements, and wherein said concave and convex surfaces extend, in radial direction with respect to an axis of rotation of a cone disk or pulley, only over a portion of the radial dimension of said connecting joint elements.

3. The chain of claim 2, wherein said portion is between about one third to two thirds of the radial dimension of the connecting joint elements.

4. The chain of claim 1, wherein said convex surface includes a projecting protrusion or bump, forming, upon engagement with a concave surface of an adjacent connecting joint element, a pivot or roll-off fulcrum;

and wherein said clearance recess in the aperture (5) of the link elements (2) is large enough to accept said protrusion or bump with clearance.

5. The chain of claim 1, wherein said chain is assembled with connecting joint means having their pairs of connecting joints arranged in the following manner:

one (2c) of said link elements retains two connecting joint means (4) in which the pairs of connecting joints are located with the concave surface of the inner ones of the pairs of connecting joint elements facing each other;

an adjacent link element (2b) is arranged to have the conncting joint means therein positioned such that the convex side of an innermost joint element faces the concave side of an innermost joint element of a second pair of connecting joint means; and wherein a third link element (2a) is arranged with the connecting joint means positioned such that the convex sides of the innermost connecting joint elements of both pairs face each other.

6. The chain of claim 1, wherein said connecting joint means are located within the apertures of the link elements (2) with the convex surfaces thereof facing longitudinally of the chain.

7. The chain of claim 1, wherein said connecting joint means are located within the apertures of the link elements (2) with the concave surfaces thereof facing longitudinally of the chain.

8. The chain of claim 1, wherein said connecting joint means are located in the apertures with the link elements of one connecting joint means (4) having their convex surfaces facing longitudinally of the chain and the connecting joint elements of the other connecting joint means having their concave surfaces facing longitudinally of the chain.

9. The chain of claim 1, wherein said link elements (2) are identical; and wherein all of the connecting joint elements (1) are identical.

10. The chain of claim 1, wherein said joint engagement surfaces on said connecting joint elements (1) and said link engagement surfaces on the link elements (2; 2a, 2b, 2c) comprise engagement surface regions which are located, with respect to an axis of rotation of a cone disk or pulley, in radially staggered position; and wherein said joint elements (1) are in engagement with the link elements by engagement of the respectively radially located engagement surface regions.

* * * * *